US006588082B2

(12) United States Patent
Dahlinger et al.

(10) Patent No.: US 6,588,082 B2
(45) Date of Patent: Jul. 8, 2003

(54) LARGE VOLUME TWIN SHAFT COMPULSORY MIXER

(75) Inventors: Gerald Lee Dahlinger, Rippon, CA (US); Roberto Salgarollo, Herentals (BE); Ronald M. Guntert, Jr., Stockton, CA (US)

(73) Assignee: Guntert & Zimmerman Const. Div., Inc., Ripon, CA (US)

( * ) Notice: Subject to any disclaimer, the term of this patent is extended or adjusted under 35 U.S.C. 154(b) by 0 days.

(21) Appl. No.: 10/210,233

(22) Filed: Jul. 31, 2002

(65) Prior Publication Data

US 2002/0181319 A1 Dec. 5, 2002

Related U.S. Application Data

(62) Division of application No. 09/694,718, filed on Oct. 23, 2000, now Pat. No. 6,450,679.

(51) Int. Cl.[7] .................................................. B23P 6/00
(52) U.S. Cl. .................... 29/402.08; 366/348; 366/349; 366/42
(58) Field of Search ......................... 29/402.08, 402.01; 366/348, 349, 42, 192, 193, 184, 66, 194, 186, 189, 297, 301, 13; 222/556; 251/301; 406/180; 193/2 A; 138/172

(56) References Cited

U.S. PATENT DOCUMENTS

| | | | |
|---|---|---|---|
| 558,802 | A | 4/1896 | Greene |
| 558,876 | A | 4/1896 | Jennings |
| 770,855 | A | 9/1904 | Hetherington |
| 865,365 | A | 9/1907 | Drake |
| 973,656 | A | 10/1910 | Hess |
| 1,363,230 | A | 12/1920 | Clark |
| 1,466,638 | A | 8/1923 | Browne |
| 1,667,959 | A | 5/1928 | Talbot et al. |
| 1,741,013 | A | 12/1929 | Cummer |
| 1,969,545 | A | 8/1934 | Bollard |
| 2,570,042 | A | 10/1951 | West |
| 2,638,254 | A | 5/1953 | Heltzel |
| 2,663,466 | A | 12/1953 | Heltzel |
| 2,679,335 | A | 5/1954 | Bell |
| 2,961,224 | A | 11/1960 | Wright |
| 3,295,698 | A | 1/1967 | Ross et al. |
| 3,380,475 | A | 4/1968 | Armstrong |
| 3,522,927 | A | 8/1970 | Hulet |
| 3,532,252 | A | 10/1970 | Brock |

(List continued on next page.)

*Primary Examiner*—Tony G. Soohoo
(74) *Attorney, Agent, or Firm*—William Michael Hynes; Townsend and Townsend and Crew LLP

(57) ABSTRACT

A twin shaft "compulsory mixer" having a capacity in the range of twelve cubic yards has a static mixing chamber bottom defined from two horizontally disposed and interfering cylindrical shapes. Two centrally disposed elongate rectilinear discharge gates are each defined from an end in the bottom of the static mixing chamber to abut at the middle of the static mixing chamber. At the middle bottom of the static mixing chamber, a tensioning rod is placed extending normally across the abutted ends of the two rectilinear slots. Two eccentrically mounted elongate rectilinear gates are mounted for movement into and out of sealing relation to the rectilinear slot centrally of the static mixing chamber. These gates are mounted centrally of the mixing chamber to a pillow block and spherical bearing arrangement and actuated at the respective static mixer chamber ends by conventional piston drives. Reducing the gates in length, reduces deflection making chamber sealing possible. Further, the tensioning rod adjusts for chamber deflection. Finally, the eccentrically mounted elongate rectilinear gates can be rotated in opposite directions to deposit concrete on opposite sides of a concrete off-loading and elevating conveyor. Discharge of mixed concrete at maximally controlled rates can occur in a balanced fashion to an underlying conveyor for elevation and discharge from the large capacity compulsory mixer forming the foundation of the portable modular plant.

2 Claims, 9 Drawing Sheets

U.S. PATENT DOCUMENTS

| | | | |
|---|---|---|---|
| 3,575,376 | A | 4/1971 | Arvidson, Jr. |
| 3,759,492 | A | 9/1973 | Hall |
| 3,876,179 | A | 4/1975 | Baumann |
| 3,885,771 | A | 5/1975 | Baumann |
| 3,904,723 | A | 9/1975 | Prince |
| 4,114,785 | A | 9/1978 | Dugge |
| 4,281,934 | A | 8/1981 | Krause et al. |
| 4,358,205 | A | 11/1982 | Eakins |
| 4,462,693 | A | 7/1984 | Buschbom et al. |
| 4,473,175 | A | 9/1984 | Zengaffinen et al. |
| 4,752,134 | A | 6/1988 | Milek |
| 4,758,095 | A | 7/1988 | Martinek |
| 4,832,498 | A | 5/1989 | Milek |
| 4,957,221 | A | 9/1990 | Murray |
| 5,009,345 | A | 4/1991 | McSweeney et al. |
| 5,556,196 | A | 9/1996 | Lin |
| 5,810,475 | A | 9/1998 | St. Ama |
| 6,010,041 | A | 1/2000 | Lonardi et al. |

LARGE VOLUME TWIN SHAFT COMPULSORY MIXER

This application is a divisional application of U.S. Ser. No. 09/694,718 filed Oct. 23, 2000, now U.S. Pat. No. 6,450,679.

This invention relates to so-called twin shaft, compulsory mixers. More specifically, a large volume twin shaft, compulsory mixer having a capacity exceeding 12 cubic yards is utilized in combination with an elevating concrete conveyor to mix and convey concrete from the foundation of a modular portable concrete plant. Problems related to discharge gate deflection and compulsory mixer chamber deformation are disclosed and solved.

BACKGROUND OF THE INVENTION

Concrete mixers in North America are usually of the rotating tilting drum variety. In such mixers, a rotating cylinder that tilts on its axis of rotation is utilized. Initially, the drum is in a tilted orientation to have its open end elevated. Depending on the manufacturer, the drum is filled with the constituents of concrete including cement, aggregate, sand, and water either through its discharge opening or through the opposite end. Paddles are fastened to the interior of the rotating drum. Upon rotation, the constituents act against the paddles and the force of gravity to be stirred and moved within the rotating drum. In part, some of the mixing action is by the concrete being lifted by the mixer paddles then falling to the bottom of the drum into the rest of the concrete. By both interfering flows within the rotating drum and the paddle stirring against the force of gravity, mixing occurs.

Upon completion of mixing, drum tilting occurs about the axis of rotation to dispose the discharge end of the drum generally downward. To enhance discharge of the concrete, on some tilting drum mixer designs, the drum is provided with reverse rotation. During this reverse rotation, the now mixed concrete constituents are moved by the force of gravity interacting with paddles interior of the drum from the closed drum end towards the open drum end. The mixed concrete is discharged from the open end of the rotating and tilted drum.

Rotating drum mixers have their disadvantages. Mixing utilizing the force of gravity takes time. In the case of mixing low slump or optimum moisture materials their mixing efficiency is low. Further, in the usual cases, in order to permit discharge, the rotating drums must be elevated. This requires the elevated support of considerable weight. Further, since the drums are tilted after mixing occurs, considerable torque must be resisted. In the usual case, both foundation structures and upwardly extending structural supports must be supplied to such rotating drum mixers. Rotating drums are unsuitable for use as a foundation for other parts of a mixing plant.

So-called twin shaft "compulsory mixers" for concrete are old and well known. These mixers, invented in 1888, cause the constituents of concrete to be rapidly mixed along interfering paths without rotating drums. Compulsory mixers have counter rotating paddle systems in an otherwise static mixing chamber to enable thorough mixing with great rapidity. In what follows, we will set forth the modem construction and usage of such mixers.

In their modern construction, compulsory mixers have an open top to a static mixing chamber. The static mixing chamber has a bottom defined from two horizontally disposed and interfering cylindrical shapes. A first cylindrical shape formed along a first horizontal axis defines a little over one half the volume and bottom profile of the static mixing chamber. A second cylindrical shape formed along a second horizontal and parallel axis defines a little over a second one half of the volume and remaining bottom profile of the static mixing chamber. The cylinders defining the bottom profile of the mixing chamber overlap or interfere at respective interfering sections interior of the volume of the mixing chamber. This interference occurs along cylindrical segments extending centrally of the volume of the static mixing chamber.

Counter rotating paddle systems effect mixing within such compulsory mixers. Each mixing paddle system rotates co-axially within and along the axis of the interfering cylinders defining the bottom of the chamber. A first paddle system has a first axis of rotation co-axial to the first horizontal axis of the first cylinder defining half the volume of the mixing chamber. A second paddle system has a second axis of rotation co-axial to the second horizontal axis of the second cylinder defining the remaining half of the volume of the mixing chamber. Each paddle system has canted paddles to sweep concrete constituents in their respective cylinders from the sides of the cylinders to and toward the interfering portion of the cylinders defining the volume of the static mixing chamber. Dual spiral motions directed to one static mixing chamber end occurs. During their rotation, the paddles systems overlap and interleave at the interfering portions of the cylinders defining the volume of the static mixing chamber.

The arrangement and rotation of each set of mixing paddles imparts to the concrete constituents a spiral pattern within each half of the volume of the static mixing chamber. The interfering portions of the cylindrical volumes defining the static mixing chamber result in the superimposition of the two spiral patterns. These superimposed and interupted spiral patterns produce a compulsory and interfering concrete constituent flow resulting in a three-dimensional interfering flow path within the static mixing chamber. A high degree of turbulence is promoted. Mixing at the interfering portions of the cylinders is most intensive, resulting in a rapid homogeneity and cement dispersion or thorough mixing of the concrete constituents.

Unlike the rotating drum mixer, the discharge of the mixed concrete constituents from a compulsory mixer does not use or require mixing chamber movement. Instead, it is necessary to supply the bottom of the static mixing chamber with an opening.

To discharge mixed concrete from the static mixing chamber, an elongate rectilinear opening is provided parallel to the axial length of the two cylinders defining the volume and bottom profile of the static mixing chamber. Specifically, at the juncture of the interfering cylinders along the bottom of the mixing chamber, there is placed an elongate rectilinear opening. This elongate rectilinear opening is opened and closed by a rotating gate.

The rotating gate is provided with a sealing surface that is correspondingly elongate and rectilinear with respect to the elongate rectilinear opening. In a first position, the rotating gate at the elongate rectilinear eccentric surface tightly seals the elongate rectilinear opening. When mixing occurs, concrete constituents, especially water, cement and sand, cannot easily escape out the bottom of the compulsory mixer chamber.

When mixing is complete and concrete discharge is desired, the gate is rotated. Rotation occurs from a position that seals the bottom of the chamber to a position that opens the bottom of the chamber. Discharge of the mixed concrete constituents from the interior of the static mixing chamber occurs.

It has been realized that rapid emptying of the mixed concrete is required to reduce mixing cycle times. For this reason, the opening of the rectilinear slot at the bottom of the mixing chamber must be maximized. In order to maximize this opening, the elongate rectilinear portion of the gate is eccentrically mounted with respect to the axis of rotation of the gate. Specifically, the gate defines a chord occupying about one third of the arc produced by the cylinder of rotation of the gate.

With such an eccentric gate, rotation of the gate through an arc of about 120° is required. The top of the eccentrically mounted elongate rectilinear portion of the gate moves out of sealing relation to the rectilinear slot centrally of the static mixing chamber. As rotation continues, the sealing side of the eccentrically mounted elongate rectilinear portion of the gate is no longer disposed to the mixed concrete. Instead, the reverse side of the eccentrically mounted elongate rectilinear portion of the gate forms a mixed concrete discharge chute. This discharge chute forms flow path opening well over one-half of the cylinder of rotation defined by the rotating gate. Rapid discharge can occur.

During this described opening of the eccentrically mounted elongate rectilinear gate, the counter rotating paddle systems maintain their rotation. As a result, mixed concrete constituents are impelled to the open discharge gate. Rapid emptying of the compulsory mixer occurs not only responsive to the forces of gravity but additionally with respect to the sweeping action of the interfering paddle systems.

Modern concrete mixing plants, especially those mixing plants used for roads and runways, require mobility and production capacity. In addition to this, the selected mixer must uniformly mix the concrete without increasing the mixing time otherwise production capacity is diminished. Because of these shortcomings, the tilting drum mixer loses its utility. The tilting drum mixer is difficult to mount in its required elevated and torque reinforced disposition. Such mounting requires at least semi-permanent foundations. Moreover, mixing takes too long. Finally, such mixers cannot be used as foundations for the portable plants to which they are attached. Simply stated, a rotating drum is an unsuitable foundation for anything.

Compulsory mixers—because of their shorter mixing cycles and their ability to uniformly mix low-slump materials—have found favorable use, especially in the European market. They have not been widely accepted in the North American paving market because such mixers have been constrained in batch capacity. Specifically, the largest compulsory mixers now manufactured in Europe are limited to batch sizes of about 4.5 to 6 cubic meters or 6 to 8 cubic yards of vibrated and compacted concrete. The largest compulsory mixer ever built is in the order of 7.5 m3 (9.9 cyd) of vibrated and compacted concrete. Generally, the European practice is to double batch or to load two batches in each hauling truck. This is practical in Europe because job production rates expected and customary are approximately half of expected and customary production rates in the North America. North American contractors need high production to be competitive. The required North American concrete production rates per hour could never be realized by following the accepted European practice of double batching. Thus the mixer batch sizes must match the full hauling ability of their trucks that varies from 7.5 to 12 cyd (sometimes 13 cyd) depending if they are are hauling on or off road.

Before this disclosure, compulsory mixers were mounted at an elevation where they generally overlie their required discharge. For example, where discharge occurs to a truck, the compulsory mixer is mounted at an elevation overlying the truck.

In an attempt to increase the capacity of compulsory mixer plants, and to hold a batch when a truck is not available, concrete discharging to a batching hopper has been utilized. In this case, the compulsory mixer requires even further elevation. First, elevation sufficient to discharge to the batching hopper occurs from the compulsory mixer. Thereafter, the batching hopper must be elevated to discharge to and to clear an underlying truck. Thus, the compulsory mixer must be at an elevation overlying both the batching hopper and the transporting truck.

Even where a batching hopper is utilized, mixing time in the compulsory mixer is nearly doubled. Simply stated, it takes almost twice as long to mix two batches in a compulsory mixer as it does to mix one large (combined) batch in a compulsory mixer. We have realized that the increase in size for a compulsory mixer would be extremely desirable for this type of mixer to gain acceptance in the North American market.

Discovery of Problems

In U.S. patent application Ser. No. 09/255745, filed Feb. 23, 1999, entitled Portable and Modular Batching and Mixing Plant for Concrete, there is disclosed a compulsory mixer. As of the filing of this disclosure, publication of this application and design has not yet occurred.

In this disclosure, a so-called two-trailer portable and modular batch plant is disclosed. First, a mixer trailer includes a compulsory mixer, cement silo and a generator set. A second trailer is an aggregate trailer, control cabin and a water tank.

The compulsory mixer in this disclosure is placed on the ground, along with the trailer structure, so as to form the foundation for the plant. The required cement silo erects to overly the compulsory mixer. The compulsory mixer is unloaded at its rectilinear slot located centrally of and underneath the static mixing chamber by an underlying conveyor. The underlying conveyor receives, elevates and discharges the concrete either to a batching hopper or an awaiting truck.

The compulsory mixer in this disclosure is of limited capacity. It mixes about six cubic yards of vibrated and compacted concrete per batch. Consequently, the capacity of the plant is limited to under 300 cubic yards per hour (228 cubic meters per hour). If the hauling trucks are of 12 cyd (9.12 m3) capacity, then the truck must wait for two batches to be mixed and discharged before pulling away.

Aside from this disclosure, we are unaware of compulsory mixers unloading to an underlying conveyor. Accordingly, in this disclosure we claim novelty directed to a compulsory mixer unloading to an underlying conveyor. Such unloading by an underlying conveyor enables a compulsory mixer to serve as a foundation for a portable, modular concrete batching and mixing plant.

Further, in U.S. patent application Ser. No. 09/665891, filed Sep. 20, 2000, entitled High Volume Portable Concrete Batching and Mixing Plant, the inventors set forth a four-trailer modular and portable concrete batching plant. Simply stated, the compulsory mixer and the silo are mounted on separate trailers. The aggregate trailer and control trailer remain essentially unchanged.

In this disclosure, we cite the need for a compulsory mixer having capacity in the range of over 12 cyds (9.12 m3) of vibrated and compacted concrete. We have undertaken the design of such a compulsory mixer.

In this design, we have uncovered problems related to the discharge of such a large compulsory mixer. As it is understood that the discovery of a problem can constitute invention, the inventors claim invention both in the discovery of the problem to be solved as well as the solution to the discovered problem.

First, the reader will appreciate that a compulsory mixer having capacity in excess of 12 cyds is large and subject to high stress. Furthermore, as the length, depth and width of the mixing chamber increases, the volume of concrete contained in the static mixing chamber places considerable loading on the chamber. From empirical experience, there is an optimum ratio of width to length, as well as an optimum depth, when designing of a compulsory mixer to ensure the most efficient mixing. Ideally, the width and length of the mixer want to be approximately the same dimension. The height of the concrete in the mixer does not want to reach beyond the top of the mixing shafts. These become major design constraints when increasing the size of a mixer. Furthermore, in order to enable transport of the disclosed compulsory mixer, one is also constrained by a maximum practical and legal transport width of less than 12' in North America and 3.5 m in Europe. Twelve cubic yards of concrete weighs in excess of 50,000 pounds. We have discovered that such loading on the eccentrically mounted elongate rectilinear discharge gate causes deflection in a traditional single gate design. Specifically, these gates are required to maintain a tight seal so that water, cement, and sand does not escape from the static mixing chamber. Unfortunately, as the length dimension of the gate increases, the tendency of the discharge gate to deflect also increases. Sealing would be an impossible task and unacceptable leakage would result.

It is important that the vertical gate deflection resulting from the weight of the gate and concrete be kept to a minimum in order for the gate seals to work effectively. This is especially important when considering how critical the proper water content is in a concrete mix. In our consideration of this design, it became apparent that if only one gate was used for this large (long) mixer that the cross-section of the gate would have to be increased substantially to keep this deflection to a minimum. Unfortunately, as the gate cross-section is increased the effective gate opening is decreased. A large gate opening is essential to achieve fast discharge for the short batch cycle times required for high production batch plants.

Second, normal measures to reduce deflection of the gate do not work. In the usual case, where a beam deflects under loading, adding to the depth of the beam normal to the loaded surface of the beam reduces deflection. This expedient will not work in the case of the eccentrically mounted elongate rectilinear discharge gate. Specifically, when the depth of the eccentrically mounted elongate rectilinear discharge gate is increased, the area available for discharge is correspondingly decreased. Stated in other terms, increased gate depth obstructs discharge, requiring longer intervals for the discharge. To prevent undue discharge delay, we have discovered that the design of the gate must be changed to prevent undue deflection.

Third, not only does the weight of the concrete deflect the eccentrically mounted elongate rectilinear discharge gate, it also deflects the static mixing chamber at the correspondingly elongated rectilinear discharge. Specifically, the dimension of the static mixing chamber changes relative to the gate. The tendency is for this rectilinear discharge opening to want to widen in the middle relative to the ends (a bulging effect). Again, unacceptable leakage occurs.

SUMMARY OF THE INVENTION

A compulsory mixer having a capacity in excess of 12 cubic yards has a static mixing chamber bottom defined from two horizontally disposed and interfering cylindrical shapes. A first cylindrical shape formed along a first horizontal axis defines a little over one-half the volume and profile of the bottom of the static mixing chamber. A second cylindrical shape formed along a second horizontal and parallel axis defines a little over a second one-half of the volume and remaining profile of the bottom of the static mixing chamber. The cylinders defining the bottom of the mixing chamber overlap or interfere at respective interfering sections interior of the volume of the mixing chamber. This interference occurs along cylindrical segments extending centrally of the volume of the static mixing chamber. Two centrally disposed elongate rectilinear discharge gates are each defined from an end in the bottom of the static mixing chamber to abut at the middle of the static mixing chamber. At the middle of the bottom of the static mixing chamber, a tensioning rod is placed extending normally across the abutted ends of the two rectilinear slots. Two eccentrically mounted elongate rectilinear gates are mounted for movement into and out of sealing relation to the rectilinear slot centrally of the static mixing chamber. These gates are mounted centrally of the mixing chamber to a pillow block and spherical bearing arrangement and actuated at the respective static mixer chamber ends by conventional piston drives. Reducing the gates in length reduces deflection. Further, the tensioning rod adjusts for chamber deflection. Finally, the eccentrically mounted elongate rectilinear gates can be rotated in opposite directions to deposit concrete on opposite sides of a concrete off-loading and elevating conveyor. Discharge of mixed concrete at maximally controlled rates can occur in a balanced fashion to an underlying conveyor for elevation and discharge from the large capacity compulsory mixer. The resultant compulsory mixer can be placed as the low profile foundation of a modular portable mixing plant.

DESCRIPTION OF THE SPECIFIC EMBODIMENTS

Figure 1A:
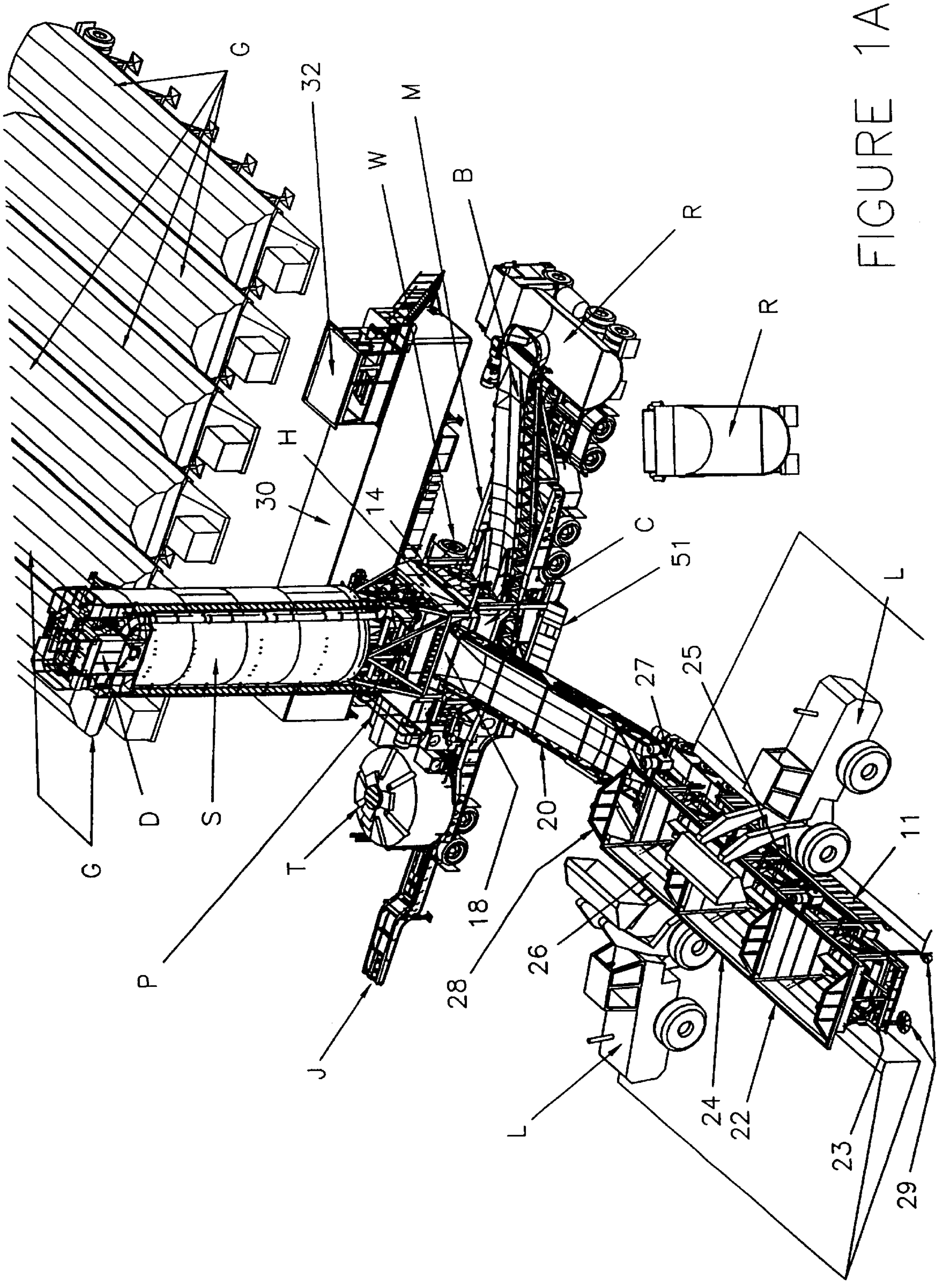
FIG. 1A is a perspective view of an erected and operating portable concrete batching and mixing plant in accordance with this disclosure illustrating the silo erected overlying the compulsory mixer with a connected aggregate batching attended by loaders with nearby control trailer with control, power, and admixture supply with six cement storage guppies pneumatically off loading cement and cement substitutes schematically shown.

Referring to FIG. 1A, a perspective view of an assembled concrete plant P is shown. Centrally of FIG. 1A is mixer trailer M having water tank T, compulsory mixer C, and mixed concrete elevating belt B. Two twelve-yard dump trucks R are shown ready for sequential loading. This compulsory mixer may be able to handle and uniformly mix batches of up to 13 cyds. Of course, batches smaller than 12 cyds can be batched and mixed at any time.

Silo trailer S is shown connected at cantilever beams 14 to rear-steered silo trailer wheel set W. As can be observed in FIG. 1B, silo trailer S is elevated with respect to rear steered silo trailer wheel set W; the process by which this elevation occurs will be more apparent when referring to FIG. 1B.

Between silo trailer S and compulsory mixer C there is provided dust hood H. The dust hood H is a part of the silo lifting structure. Dust within hood H is evacuated by vertical plenum to dust collector. Hood H defines aggregate aperture 18 open to receive aggregate from aggregate trailer A as conveyed by aggregate transport conveyor 20. This opening for the conveyed aggregates is located in the dust hood on the side opposite the cantilever lifting structure.

Aggregate trailer A includes sand bin 22, fine aggregate bin 24, and course aggregate bin 26. Underlying each of these bins are respective weigh conveyors 23, 25, and 27. These weigh conveyors 23, 25, and 27 receive from each bin weight measured charges of aggregate, discharge to aggregate collection conveyor 20 and the aggregate collection conveyor 20 discharges on to a aggregate elevating conveyor. This aggregate elevating conveyor elevates and causes aggregates to be appropriately batched into compulsory mixer C. As can be seen, because of the high volume flow of concrete, up to two loaders L service the respective bins with required aggregate. Ramps are required on either side of the aggregate trailer so the loaders L can reach the center of the bins. Ramp bulkheads 11 are provided on either side of the aggregate trailer to facilitate building a loader ramp quickly.

Completing the assembled concrete plant P is control trailer 30 having control booth 32 and concrete liquid additive storage 34 with power plant 36. (See FIG. 4B) Further, and as is conventional with cement silo concrete plants, a series of cement and cement additive hauling guppy trailers G are used. As is well known in the art, conduits connecting the silo to the cement and cement additive hauling guppy trailers G are required. These connections are not shown in the interest of simplifying the important elements of this disclosure. Furthermore, the power plant 36 is of adequate size so that it can supply the power required to run the hauling guppies G. The control trailer 30 is arranged with conventional disconnect boxes (also not shown) where the power cords from the hauling guppies can be connected to the control trailer power distribution panel.

Plant operation is believed apparent to those having skill in the art. Specifically, compulsory mixer C has a twelve cubic yard capacity (vibrated and compacted concrete). As has been noted, compulsory mixer C may even have the capacity to uniformly mix up to a maximum of 13 cyd) with an actual enclosed volume sufficient to accommodate a loose volume of eighteen yards. Batching of cement, cement additives, water, and aggregate into the mixer can occur in less than 30 seconds. Thereafter, actual mixing operation of compulsory mixer C occurs for a period from 30 to 60 seconds starting from when the last rock enters the mixer and the first mixed concrete leaves the mixer. Compulsory mixer C bottom dumps mixed concrete to the concrete elevating belt B that in turn elevates and discharges concrete to receiving twelve-yard (more or less) dump trucks R in less than 21 seconds. Given the 964 barrel capacity of silo trailer S in cement and cement additives, the size of the aggregate weighing belts and the efficiency of the mixer, overall plant capacity up to 600 cubic yards (456 cubic meters) per hour can be attained depending on the mixing time required by specification or to reach acceptable uniformity. Dependent upon job specifications, applicable regulations, job requirements including batch sizes, slower output rates may be required.

Figure 2:
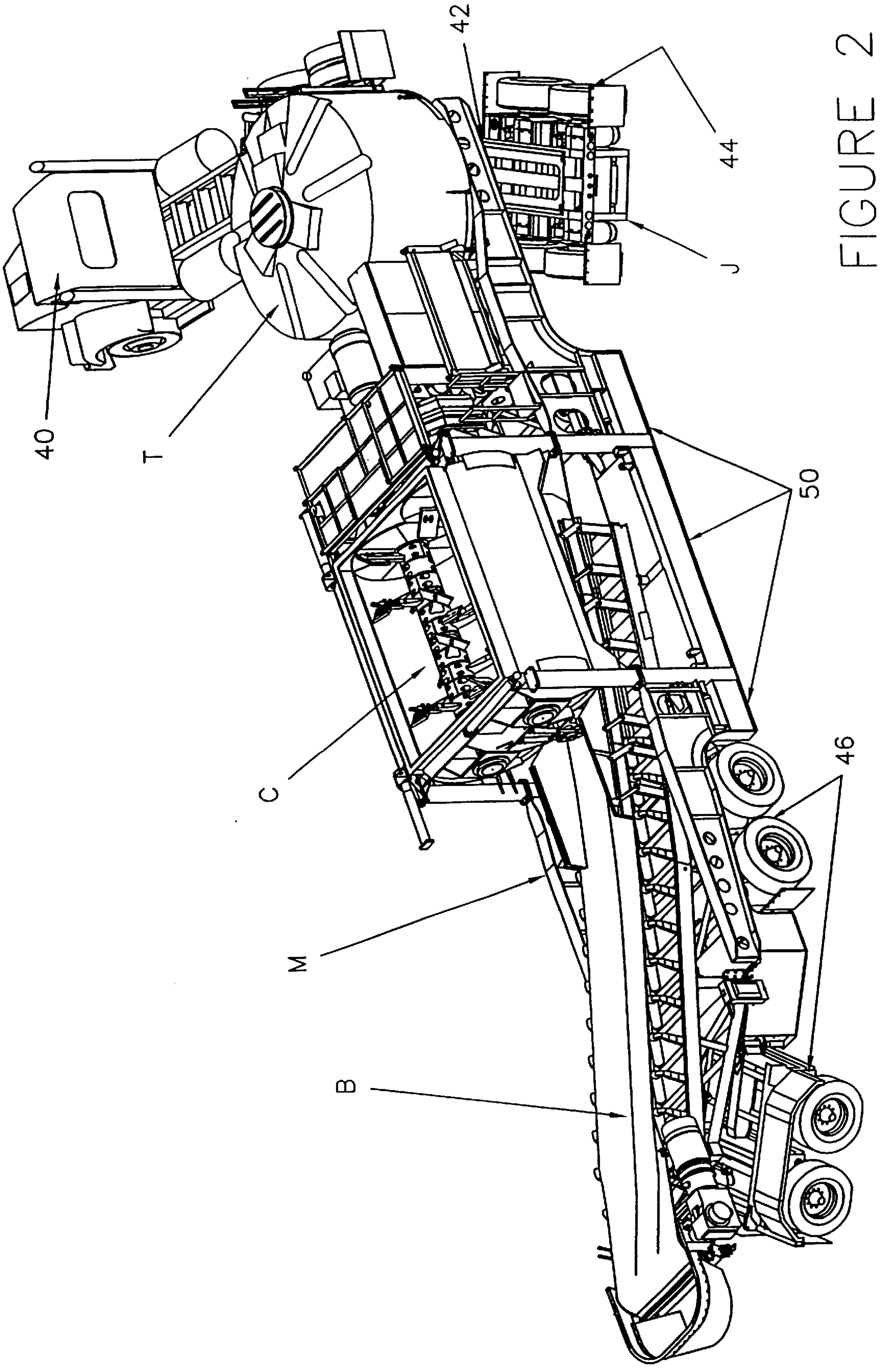
FIG. 2 illustrates the mixer trailer under transport.

Having set forth overall operation of assembled concrete plant P, the transport disposition of the compulsory mixer will be set forth. FIG. 2 illustrates mixer trailer M under transport by tractor 40 at fifth wheel 42. Because of the weight of compulsory mixer C, and the other items on the trailer, jeep J distributes the load of compulsory mixer C between fifth wheel 42 and rear jeep/tandem axles 44. Four tandem axles 46 are included in the major transporting elements of mixer trailer M.

In the assembly of plant P, mixer trailer M is the first unit in place. As such, it is lowered at pad 50 directly onto (usually prepared) solid ground. For example, such prepared solid ground can include compacted aggregate base over well-drained soil. Lowering the trailer occurs by deflation of conventional trailer air bags, not shown, between the respective rear jeep axles 44 and four tandem axles 46. In less than ideal soil, seismic or wind conditions, as an option, the mixer trailer can be supplied with outriggers 51 to increase the lateral stability of the mixer trailer with the silo erected.

Figure 1B:
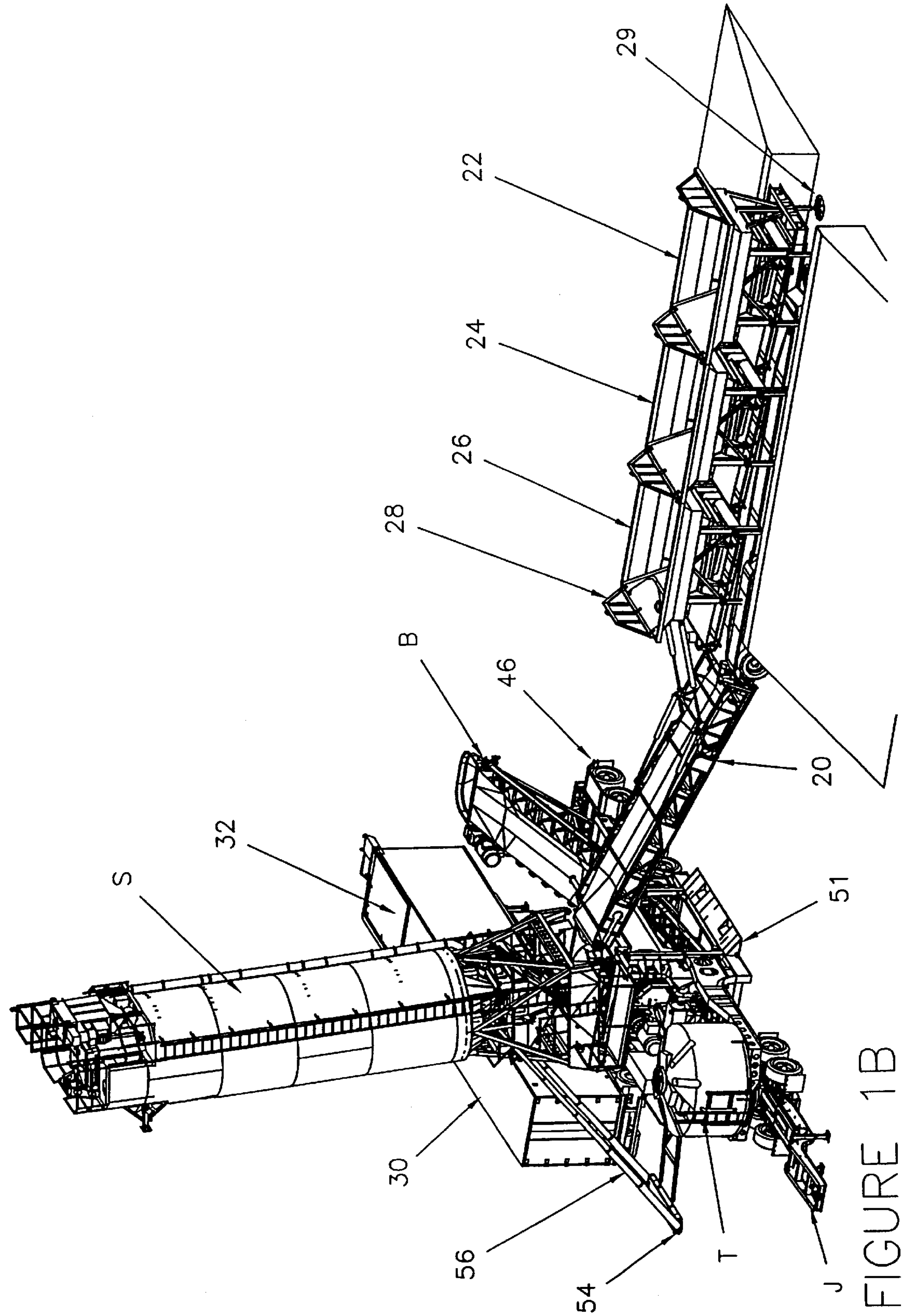
FIG. 1B is a perspective view of the aggregate trailer and mixer trailer in position in accordance with this disclosure illustrating the silo trailer being erected and moving to the top dead center position.

FIGS. 1A, 1B and 2 are all taken from U.S. patent application Ser. No. 09/665,891, filed Sep. 20, 2000, entitled High Volume Portable Concrete Batching and Mixing Plant. Therein is set forth a four-trailer modular and portable concrete batching plant assigned to the common assignee herein. Accordingly, this patent application is hereby incorporated by reference as if full set forth herein.

Reviewing that application, it will be found that the compulsory mixer C, along with the trailer structure, is used as the foundation for a portable and modular mixing plant. Further, it will be seen that the discharge of the mixed concrete comes from below the compulsory mixer on a conveyor belt B. There are compelling reasons for this design.

First, the disclosed compulsory mixer C weighs in the order of 37 tons. Further, when charged with mixed concrete, another 25 tons are present making for a total weight in the order of at least 62 tons.

Second, and because of the weight involved, an efficient portable modular plant cannot place the compulsory mixer C in an elevated disposition. As a consequence, the underlying and elevating conveyor is required. Further, servicing of the compulsory mixer C requires that maintenance take place through the upper opening of the compulsory mixer C. It is for this reason that considerable emphasis is placed on placing and removing the sealing gates 91, 92 shown in beginning with FIG. 3 from the top of the compulsory mixer.

Referring to the views of FIGS. 1A, 1B and 2, it will be seen that compulsory mixer C and conveyor belt B have an immediate underlying flat surface. This immediate underlying flat surface is intended for direct contact with the ground at the site of the portable modular concrete plant. For example, by finding firm dry ground mixed with rock, a suitable temporary foundation can be found for which the compulsory mixer C is ideal. The resultant structure has the heaviest element of the plant—the compulsory mixer—placed at essentially ground level at only that elevation where discharge to underlying conveyor belt B is required.

Figure 3:
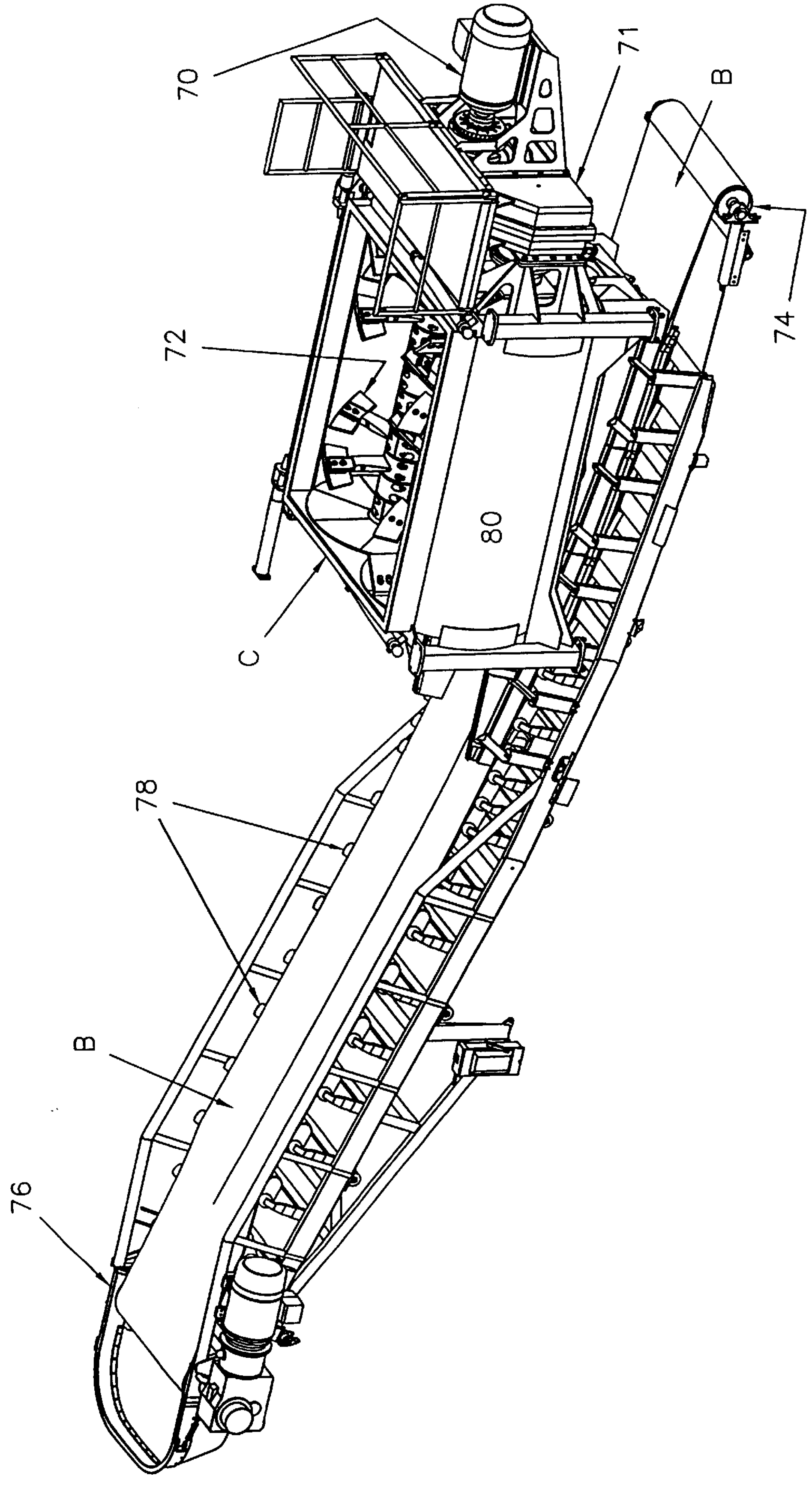
FIG. 3 is a perspective view of the compulsory mixer of this invention mounted overlying the elevating discharge conveyer.

Referring to FIG. 3, the compulsory mixer C is shown with an open top 72 rotating paddle systems 73, 74 are driven by a motor 70 through a transmission 71. As will hereinafter be more apparent discharge occurs to a conveyer belt B driven by a driving head pulley 76 and looped in an endless return fashion around a tail pulley 74. Support rollers 78 supports not in considerable weight of the concrete.

Figure 8:
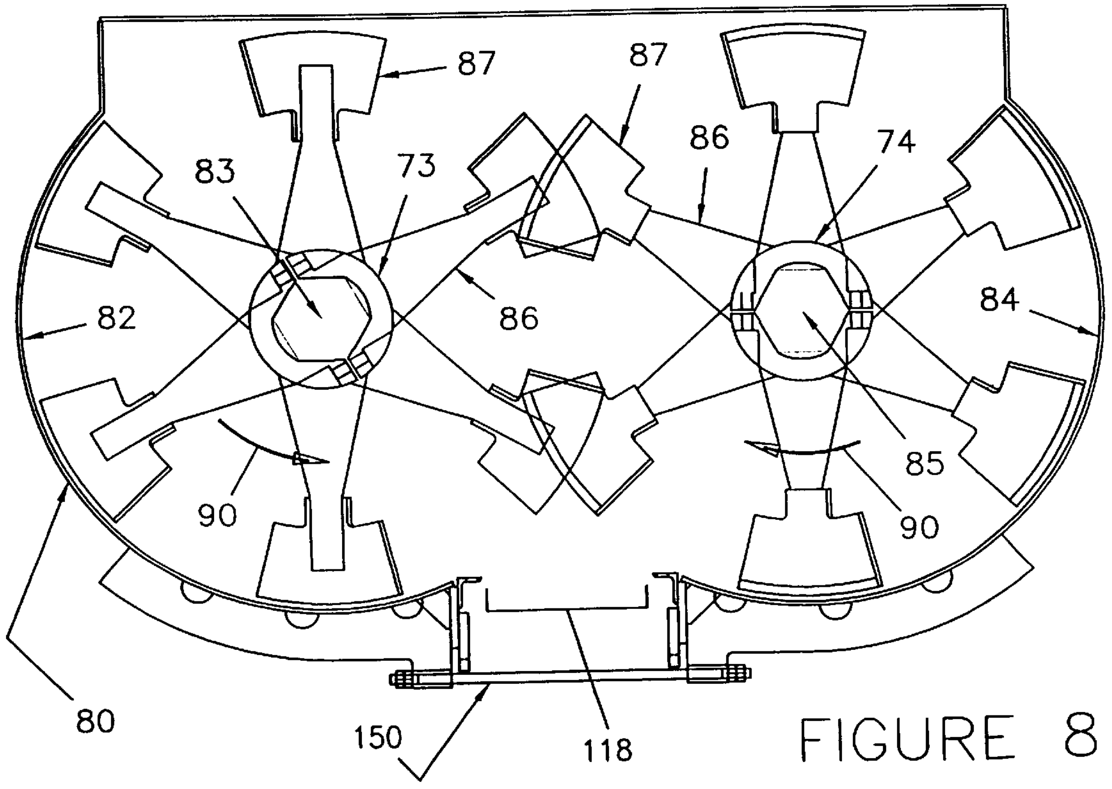
FIG. 8 is a side elevation section taken across the axis of the parallel interfering cylinders defining the bottom of the mixing chamber.

Turning briefly to FIG. 8, the construction of the static mixing chamber 80 can be understood.

The static mixing chamber 80 has a bottom and main volume defined by two interfering cylinders. A first cylinder 82 is formed about an axis 83. A second cylinder 84 is formed about an axis 85. Axes 83 and 85 are parallel to one another and faced apart.

Referring still further to FIG. 8 each paddle system, 73, 74 includes a plurality of radially extending arms 86 and paddles 87 all off of their respective axis of rotation 83, 85. These respective paddle systems rotate in a direction 90 that is counter clockwise in the case of paddle system 73 and clockwise in the case of paddle system 74. In can be seen that the cylinders 82, 84 described interior of the static mixing chamber 80 interfere. The respective paddles 87 trace the cylindrical outline and have non-interfering overlap one with another. As will be made clear with respect to FIG. 6, it is possible to lower and raise the gates from the bottom of static mixing chamber 80 by slowly counter-rotating respective paddle set 73, 74 as lowering occurs and slowly rotating respective paddle set 73, 74 as raising occurs.

Figure 4:
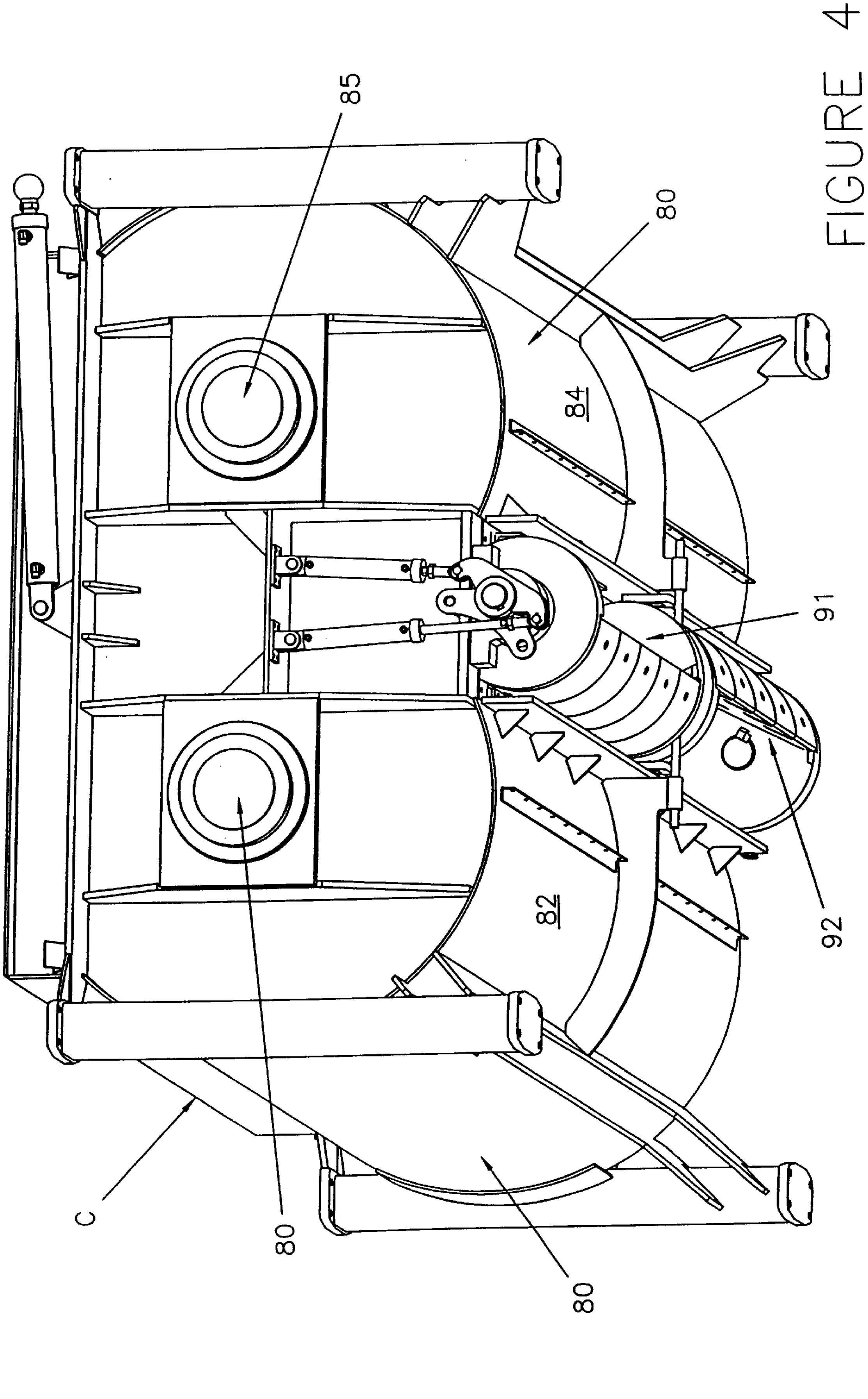
FIG. 4 is a bottom perspective view of the compulsory mixer of this invention illustrating the two gates for discharging mixed concrete in the open position, the figure illustrating the placement of the concrete to opposite sides of the underlying conveyer (not shown)

Referring to FIG. 4, a bottom perspective view is shown of the compulsory mixer C illustrating the static mixing chamber 80 having two interfering cylindrical bottoms 82, 84. It can be seen with respect to FIG. 4 that a first gate 91 and second gate 92 are each shown the open position for emptying the mixed concrete constituents interior of the compulsory mixer to the underlying conveyor belt B (see FIG. 3). It will further be observed the gate 91 in the open position discharges to one side of the belt B. Gate 92 shown in the open position discharges to the opposite side of belt B.

It is noted that the inventors seek to control the rate of discharge from static mixing chamber 80 to the conveyor.

A common installation of this type of mixer has the mixer discharging its entire batch into a surge hopper. This hopper would be fitted with a gate that is opened as required to load trucks. In this arrangement, the mixer gate could be opened fully in one step without concern of overloading the surge hopper. This is also the case when the mixer is arranged to discharge directly into trucks.

When a mixer is discharged directly to a conveyor belt it is critical that the gate opening be controlled to prevent overloading the belt. When using only one discharge gate, the degree of gate opening can be controlled. This control can be imposed by using limit switches to stop the gate in an intermediate, "partially open" position. Using two discharge gates, each equipped with an intermediate limit switch will result in better control of the concrete discharge.

This type of "rotary" discharge gate, by inherent design, does not discharge the material straight down, but to one side of the mixer center line. When the gate is at the maximum open position, the flat portion of the gate acts as a "chute" with a sliding surface that's approximately 65 degrees from horizontal. When discharging to a surge hopper or truck, this eccentric discharge is not a problem. However when discharging to a conveyor belt centrally located below the mixer and parallel with the gate length, the off-center discharge can cause spillage and misalignment of the belt on its carrying rollers (or slider bed).

With a dual gate design here disclosed we have the opportunity to discharge each gate to either side of the conveyor center line to achieve a more uniform side to side loading of the belt. This will result in maximizing the carrying capacity of the belt while minimizing the possibility of overloading and misalignment of the belt.

The reader will remember that when concrete is mixed interior of compulsory mixer C, considerable weight—in the order of 25 tons or more—is involved. This being the case, we have determined that concrete "surge" onto belt B can constitute a considerable problem. To avoid this problem, we find that our installation of two gates provides significant relief. Further, by partially opening the gates, the initial surge can be controlled. Finally, the distribution of the concrete to opposite sides of belt B by gates 91, 92 constitutes a further mitigating factor against surge. It also avoids loading the belt all on one side that can create a belt training problem.

Having set forth the array of two gates 91, 92, the construction and mounting of the gates can now be set forth.

Figure 5:
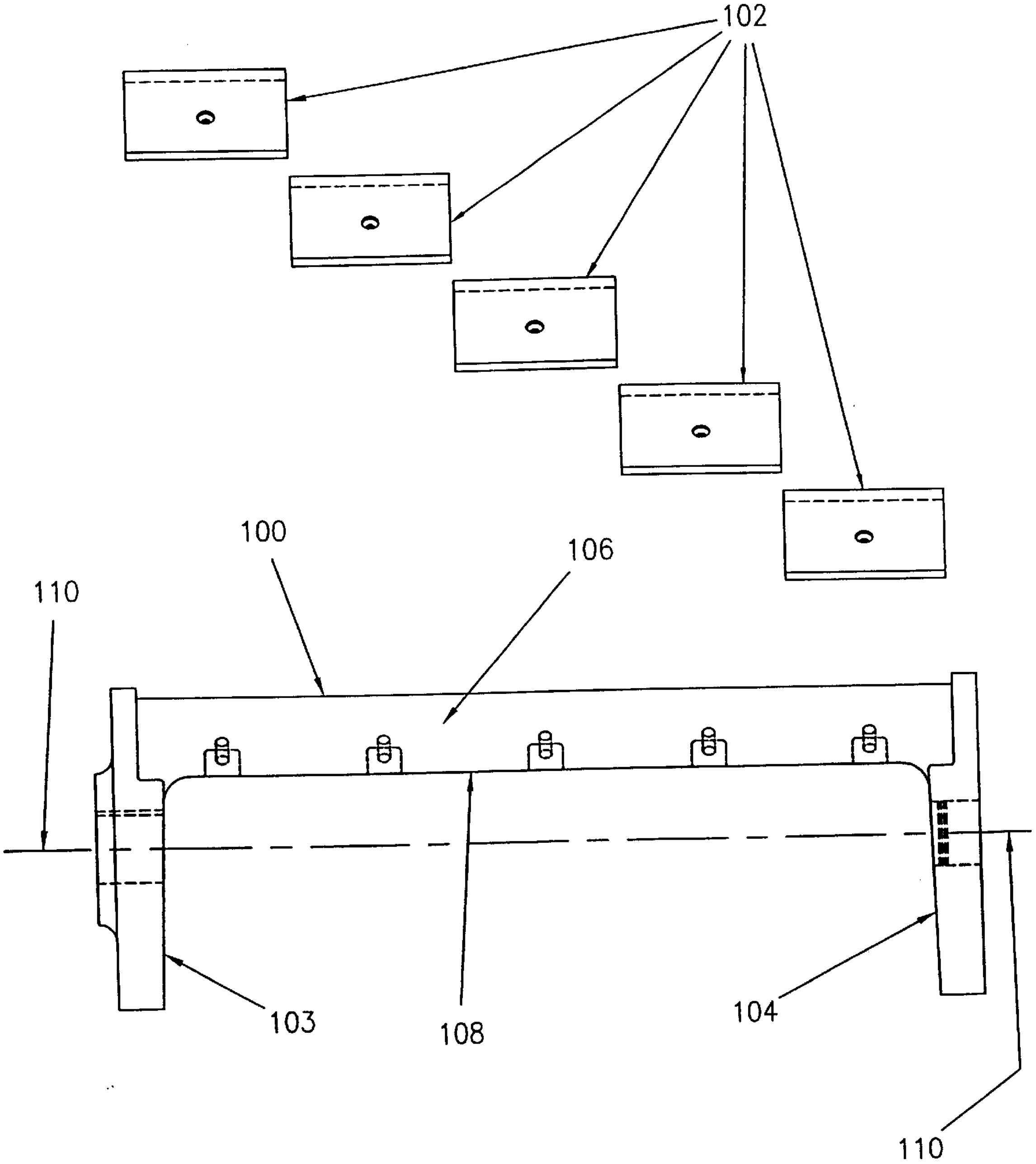
FIG. 5 is an exploded view of a gate with the tiles shown overlying the gate.

Referring to FIG. 5, a single gate 91 is illustrated. Gate 91 has wear tiles 102 shown in exploded relation overlying the gate 91. Gate 91 includes a first circular flange 102 and a second circular flange 104. Utilizing these circular flanges, the gate can be rotated. The sealing surface of gate 91 includes the tile receiving surface 106 and the dumping surface 108.

In regard to the construction of the gates 91, 92, although some mixer manufacturers have used fabricated steel weldments for the construction of smaller mixer discharge gates, it can be proven that a gate made from a steel casting will result in the best compromise between gate rigidity (minimum deflection) and maximum possible gate opening. It was found that casting one long discharge gate would be very difficult. Further, tolerances, "as cast," for the gate sealing system to work correctly are difficult to maintain. Although the cylindrical surface of the gate could have been machined to achieve the required tolerances, this construction is extraordinarily expensive. It is for this reason the construction is conventionally welded. By utilizing two gates, such a construction is tolerable.

To understand how the tile receiving surface 106 and the dumping surface 108 are eccentrically mounted with respect to the axis of rotation 110, reference will now be made to FIGS. 9A and 9B.

Figure 9B:
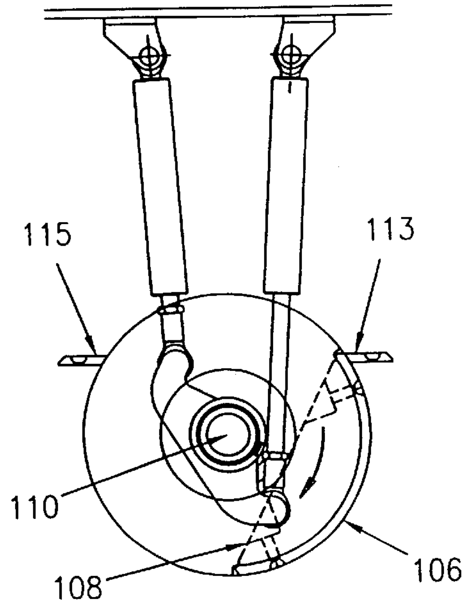
FIGS. 9A and 9B are illustrations of the actuation of one gate for the dumping of concrete.
Figure 9A:
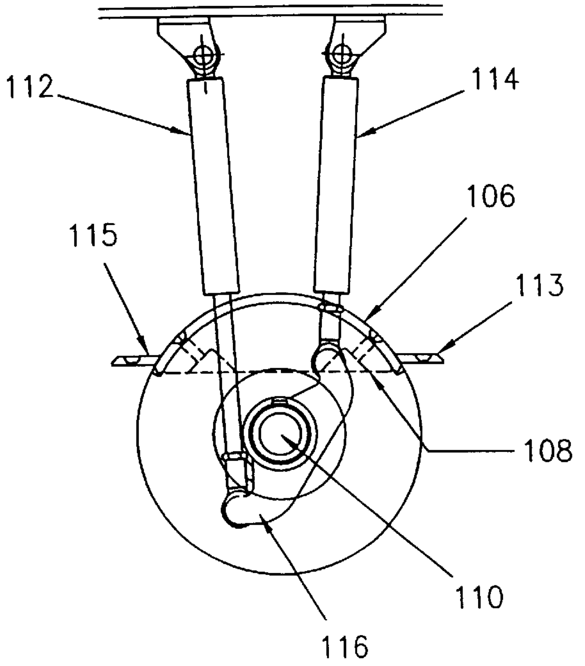

Referring to FIG. 9A, paired cylinders 112, 114 are shown acting through lever arm 116 to hold surface 106 in sealing relation between sealing tiles 112 and 114. The respective sealing tiles 112 and 114 are on opposites sides of opening 118 defined centrally of FIG. 8. When the respective cylinders 112, 114 maintain the surface 106 rotated with respect to the sealing tiles 113, 115 sealing of the chamber 80 results.

Referring to FIG. 9B, rotation of the tile surface 106 is shown to the open position. In this open position discharge side 108 of the gate forms between sealing tile 113 and the exterior of the chamber 80 (see FIG. 8) a relatively large opening. It will be noted that the opening occupies all but a small cord of the arc of rotation of tile surface 106. This is because the gate is eccentrically mounted with respect to its axis of rotation 110.

It has been established that the largest compulsory mixers C built to date have been in the order of 9.9 cubic yards capacity. It will further be remembered that the compulsory mixer C of this disclosure includes about 13 yards capacity. Further, and viewing FIG. 2, it will be seen that compulsory mixer C must be transported over roads—typically as an oversize load. Because of both the increased capacity and the necessity for road transport, we have been required to increase the length of compulsory mixer C.

We now invite attention to FIGS. 9A and 9B. Presuming that static mixer chamber 80 is provided with a single gate for discharge of mixed concrete, deflection of the gate could be anticipated. The question then becomes, why not provide simple beam reinforcement to the gate? The answer to this question is that the increased thickness required of the gate would obstruct concrete discharge. Calculations indicate that such reinforcement would cause concrete discharge flow impediment resulting in additional time for required concrete discharge that in turn reduces the number of batches per hour that the plant is capable of producing.

This can be readily understood, it will be observed that should deflection occur of the tile receiving surface 106, it would be required that surface 108 be either removed further from tile receiving surface 106 or have surface 108 interrupted by beam reinforcement. This would impart to gate 108 a much greater thickness. This thickness would interfere with opening of the slot 118 (see FIGS. 8, 9A and 9B).

Figure 6:
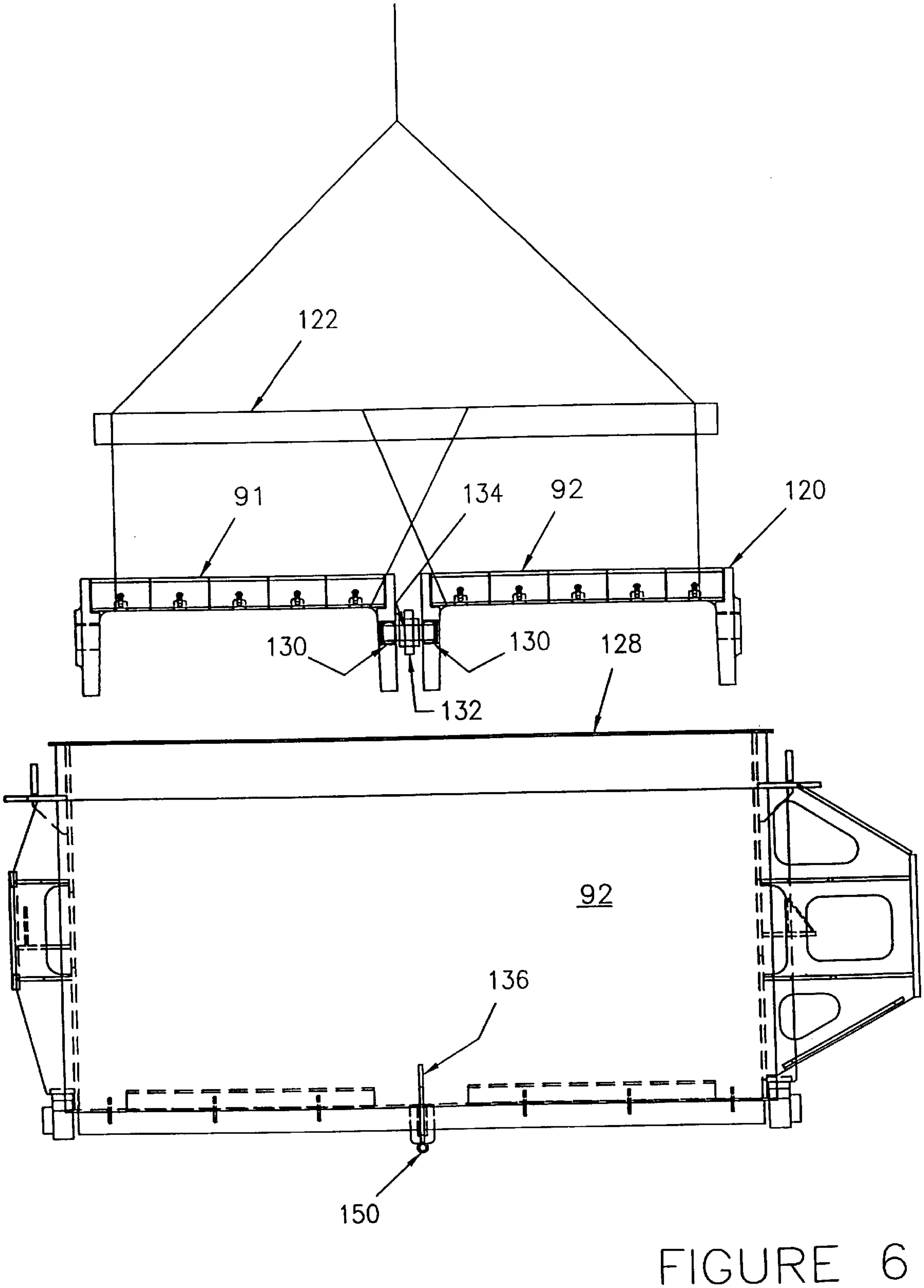
FIG. 6 is a side elevation section showing two gates similar to those of FIG. 5 being lowered into place from a spreader into the static mixing chamber.

Referring to FIG. 6, the assembly and/or disassembly of the gate structure 120 relative to the static mixing chamber 80 can be understood. A spreader 122 is shown lowering a first gate 124 and a second gate 126 into place. The idea is that the gates 124, 126 will be passed through chamber 80 at its opening 128. When this lowering occurs the respective paddle systems 73, 74, will be counter-rotated so that the respective gates pass without interference through the individual arms 86 and paddles 87 (see FIG. 8).

Once gates 91, 92 have been lowered to the bottom of static mixing chamber 80, they must be supported for rotation. Accordingly, a system of relatively precision bearing mounts must be provided Referring further to FIG. 6, it will be seen that paired spherical bearings 130 have a pillow block 132 and common shaft 134 extending between the respective gates. Pillow block 132 and shaft 134 allows each of the respective gates 124, 126 to be relatively rotated relative to the pillow block 132. Pillow block 132 is in turn received in central support, 136 in the medio portion of static mixing chamber 80.

Figure 7:
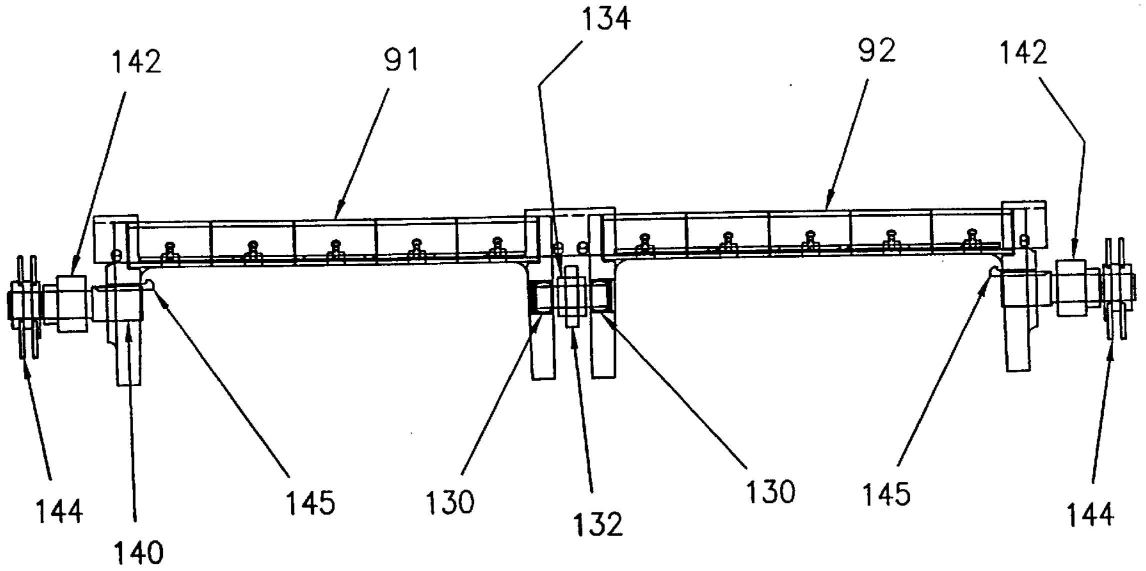
FIG. 7 is an assembly drawing of the gate alone.

Once the two gates 124, 126 together with their shaft 134 their pillow block 132 and the respective spherical bearings are in place, it is necessary to connect the respective gates 91, 92 to actuating mechanisms. Specifically, a stub shaft 140 extends into each gate from a gate end bearing 142 and actuator arms 144. Stub shaft 140 is keyed by a tapered key 145 to lock the gate 91 with respect to the shaft 140. The construction is identical at both ends of the chamber 80. Chamber 80 is not shown in FIG. 7.

Referring simultaneously to FIG. 6 and FIG. 8, a tension rod 150 will be seen extending across the bottom of static chamber 80. It will be remembered that static chamber 80 contains a volume of concrete up to 13 cubic yards weighing well over 50,000 pounds or 25 tons. Because of this, the cylindrical sidewalls 82, 84 of static mixing chamber 80 can tend to spread apart at their elongate openings 118. To prevent this spreading, a tension rod 150 is placed across the opening 118 so that its width can be appropriately adjusted during the dynamics of chamber loading.

Returning to FIGS. 1A and 1B, it will be seen that compulsory mixer C forms the foundation and heart of a modular portable concrete plant. The reader is invited to contrast this design with plants including rotating drums. Simply stated, applicant has adapted the compulsory mixer here as shown to be the foundation of a modular concrete batching and mixing plant that can be transported at least in part according to the aspect of the invention set forth in FIG. 2.

What is claimed is:

1. A process of gate replacement in compulsory mixer comprising:

- providing a static mixing chamber having an open top and a bottom defined from two horizontally disposed, parallel and interfering cylindrical shapes having axes extending parallel and through the static mixing chamber;
- providing two centrally disposed elongate rectilinear discharge openings, each opening parallel to the axis of the horizontally disposed, parallel and interfering cylindrical shapes and defined from an end in the bottom of the static mixing chamber to abut at the middle of the static mixing chamber;
- providing two mixing paddle systems, each system mounted for rotation about the axis
- providing two eccentrically mounted elongate rectilinear gates for rotational movement into and out of sealing relation to the centrally disposed elongate rectilinear discharge openings centrally of the static mixing chamber;
- providing bearings at either end of the eccentrically mounted elongate rectilinear gates for permitting the gates to mount for rotation into and out of sealing relation relative to the static mixing chamber; and,
- joining the gates at an adjacent end of the gates to a central bearing;
- lowering the gates as joined into the mixing chamber while rotating the mixing paddles systems to permit entry of the gates without interference from the mixing paddles; and,
- when the gates are in place, placing bearings between the chamber ends and the gates to permit gate rotation relative to the centrally disposed elongate rectilinear discharge openings.

2. The process of gate replacement in compulsory mixer according to claim 1 comprising:

- after the gates are in place, placing tile juxtaposed to the gates to enable sealing of the static mixer chamber to occur.

* * * * *